US010866775B2

(12) United States Patent
Totsuka (10) Patent No.: US 10,866,775 B2
(45) Date of Patent: Dec. 15, 2020

(54) PRINTING APPARATUS, METHOD FOR CONTROLLING PRINTING APPARATUS TO PERFORM CANCELLING A PRINT JOB BASED ON A LAPSE OF PREDETERMINED TIME

(71) Applicant: CANON KABUSHIKI KAISHA, Tokyo (JP)

(72) Inventor: Satoshi Totsuka, Tsukuba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/455,430

(22) Filed: Jun. 27, 2019

(65) Prior Publication Data

US 2019/0317712 A1    Oct. 17, 2019

Related U.S. Application Data

(63) Continuation of application No. 15/272,926, filed on Sep. 22, 2016, now Pat. No. 10,346,115.

(30) Foreign Application Priority Data

Sep. 28, 2015    (JP) ................................. 2015-190466

(51) Int. Cl.
*G06K 15/00* (2006.01)
*G06F 3/12* (2006.01)

(52) U.S. Cl.
CPC ............ *G06F 3/1267* (2013.01); *G06F 3/121* (2013.01); *G06F 3/1222* (2013.01); *G06F 3/1238* (2013.01); *G06F 3/1285* (2013.01)

(58) Field of Classification Search
None
See application file for complete search history.

(56) References Cited

U.S. PATENT DOCUMENTS

| 6,473,192 B1* | 10/2002 | Kidani | G06F 3/121 |
| | | | 358/1.14 |
| 2006/0127121 A1* | 6/2006 | Ueda | G03G 15/5004 |
| | | | 399/82 |
| 2014/0285834 A1* | 9/2014 | Yamazaki | G06K 15/02 |
| | | | 358/1.14 |
| 2014/0333953 A1* | 11/2014 | Kawanishi | G06F 3/1285 |
| | | | 358/1.14 |
| 2014/0340702 A1* | 11/2014 | Maki | G06F 3/1285 |
| | | | 358/1.14 |

FOREIGN PATENT DOCUMENTS

JP    2005-161841 A    6/2005

* cited by examiner

*Primary Examiner* — Henok Shiferaw
(74) *Attorney, Agent, or Firm* — Canon U.S.A., Inc. IP Division (57) ABSTRACT

A printing apparatus is provided to prevent, when an error has occurred while a print job is being executed, information leakage without significantly reducing usability. A printing apparatus capable of storing a plurality of print jobs identifies, when the error has occurred while the print job is being executed, another print job which is printable, among the stored other print jobs. The printing apparatus cancels the print job, which is being executed when the error has occurred and the identified print job, based on a predetermined time which has elapsed in a state where an error is occurring.

11 Claims, 7 Drawing Sheets

```
┌─────────────────────────────────────────────────┐
│ PASSWORD SETTING                                │
├─────────────────────────────────────────────────┤
│  READY FOR AUTHENTICATION PRINTING.             │
│  SET PASSWORD.                                  │
│                                                 │
│     DOCUMENT NAME:    FIGURE 1                  │
│                                         301     │
│        PASSWORD: [________________________]     │
│                                                 │
│                      [   OK   ]   [ CANCEL ]    │
└─────────────────────────────────────────────────┘
```

FIG. 4

| TIME | JOB NAME | STATUS |
|---|---|---|
| 18:13 | FIGURE 1 | PASSWORD INPUT WAITING |

AUTHENTICATION PRINTING

401

PRINT

PRINTING APPARATUS, METHOD FOR CONTROLLING PRINTING APPARATUS TO PERFORM CANCELLING A PRINT JOB BASED ON A LAPSE OF PREDETERMINED TIME

CROSS REFERENCE TO RELATED APPLICATIONS

This application is a continuation application of U.S. patent application Ser. No. 15/272,926 filed on Sep. 22, 2016 and which will issue as U.S. Pat. No. 10,346,115 on Jul. 9, 2019 which claims the benefit of Japanese Patent Application No. 2015-190466, filed Sep. 28, 2015, both of which are hereby incorporated by reference herein in its entirety.

BACKGROUND OF THE INVENTION

Field of the Invention

The present invention relates to a printing apparatus that controls execution of a print job, a method for controlling the printing apparatus, and a program.

Description of the Related Art

Conventionally, a printing apparatus, which controls execution of a print job, has been known. Examples of the print job include a Page Description Language (PDL) job input from a client computer that communicates with the printing apparatus via a network.

In the printing apparatus, an interruption factor (interruption event) of the print job, such as an error, can occur while the print job is being executed. If the interruption event that has occurred is "no sheet", for example, the execution of the print job is interrupted, and is not resumed unless a user replenishes sheets. On the other hand, Japanese Patent Application Laid-Open No. 11-134122 discusses a technique of preferentially executing a print job while a preceding print job remains interrupted when an event "no sheet" has occurred. This can prevent reduction of the entire processing efficiency caused by a prolonged time during which a printing apparatus is suspended.

On the other hand, Japanese Patent Application Laid-Open No. 2000-76028 discusses an authentication printing function of setting a password for a print job on the side of a client computer serving as a transmission source of the print job and executing the print job on the condition that a corresponding password is input on the side of a printing apparatus.

As described above, when the interruption event has occurred while the print job is being executed, if the succeeding job is preferentially executed, the reduction of entire processing efficiency can be prevented. However, aside from such a matter, a problem can also occur when the interrupted print job is left as it is for a long time.

For example, when there has been no A4-size sheet while a print job for printing an image on A4-size sheets is being executed, and A4-size sheets remain unreplenished for a long period of time, the interrupted print job is left unattended. To leave the print job for a long time is not preferable from the viewpoint of security particularly when a content printed based on the print job includes confidential information.

On the other hand, if an interruption event occurs while a print job is being executed, the execution of the print job can be automatically canceled. Further, if not only the print job but also other print jobs that are on standby at that time, are canceled, a security risk can be further reduced. This is because it is not easy for an owner of another print on standby to predict when the interruption event is resolved or when the print job causing the interruption event is canceled. If printing is performed at unintended timing, it is likely that a printed product is easily viewed by others.

However, the print jobs, which are holding steady, may include the print job which does not immediately proceed to the printing even if the interruption event is resolved or the print job causing the interruption event is canceled. More specifically, with respect to the print job into which the password has not yet been input on the side of the printing apparatus among the print jobs using the above described authentication printing function, the printing is not performed even if the preceding job is ended or is canceled. More specifically, a security risk is relatively low from the viewpoint of leakage of confidential information. Nevertheless, when all the print jobs are automatically canceled when the interruption event has occurred, the canceled print jobs need to be transmitted again from the client computer, which takes time and labor.

SUMMARY OF THE INVENTION

According to a technique herein disclosed, when an interruption event of a print job has occurred while the print job is being executed, information leakage can be prevented without significantly reducing usability.

According to an aspect of the present invention, a printing apparatus includes a storage unit configured to store a plurality of print jobs, a identifying unit configured to identify, when an interruption event of the print job has occurred while the print job is being executed, another print job, which is printable, among the other print jobs stored in the storage unit, and a control unit configured to cancel the print job, which is being executed when the interruption event has occurred and the print job identified by the identifying unit, based on a predetermined time which has elapsed in a state where the interruption event is occurring.

Further features of the present invention will become apparent from the following description of exemplary embodiments with reference to the attached drawings.

DESCRIPTION OF THE EMBODIMENTS

An exemplary embodiment will be specifically described below with reference to the drawings. The following exemplary embodiment is not intended to limit the invention according to claims, and all combinations of features described in the exemplary embodiment are not necessarily essential for a solution to the invention.

Figure 1:
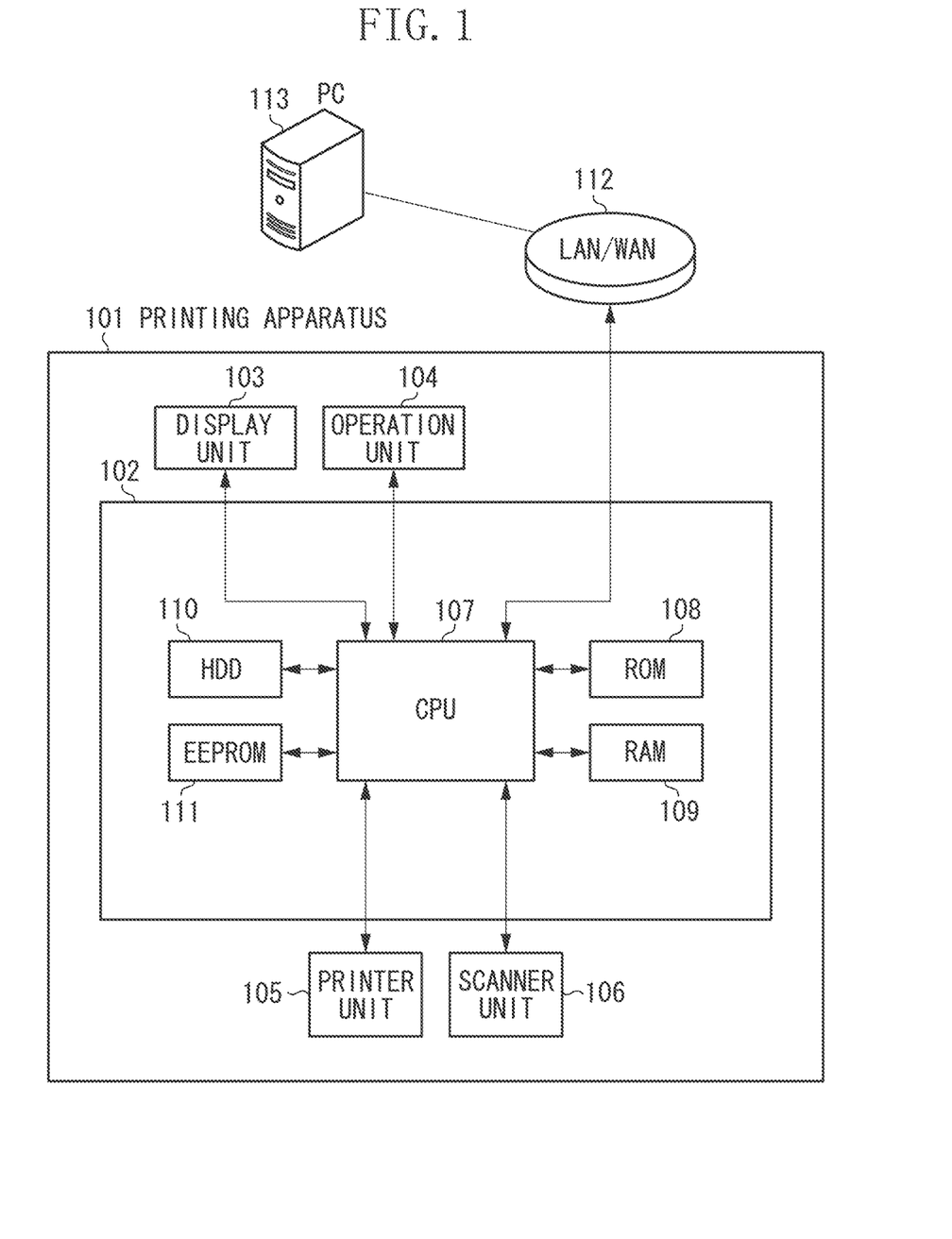
FIG. 1 is an overall view of a system including a printing apparatus according to an exemplary embodiment.

FIG. 1 is an overall view of a system including a printing apparatus 101 serving as an example of a printing apparatus according to the present disclosure. The printing apparatus 101 includes a controller unit 102, a display unit 103, an operation unit 104, a printer unit 105, and a scanner unit 106. The display unit 103 includes a light emitting diode (LED) and a liquid crystal display, and displays an operation content performed by a user and an internal state of the apparatus. The operation unit 104 receives the user's operation via a hard key group or a touch panel function of the display unit 103.

The printer unit 105 receives a printing instruction from the controller unit 102, and prints an image on a sheet based on image data transmitted from the controller unit 102. The printer unit 105 includes a fixing unit for fixing an image (toner image) transferred onto the sheet. The printer unit 105 can print the image on sheets of a plurality of sizes including an A4 size and an A3 size. The sheets include recording media such as plain paper, thick paper, and a transparent film.

The scanner unit 106 receives a reading instruction from the controller unit 102, reads an image on a document, and transmits obtained image data to the controller unit 102. The printer unit 105 can perform printing based on the image data generated by the scanner unit 106.

The controller unit 102 includes a central processing unit (CPU) 107, a read-only memory (ROM) 108, a random access memory (RAM) 109, a hard disk drive (HDD) 110, and an electrically erasable and programmable read only memory (EEPROM) 111. The CPU 107 is a means for executing a control program contained in the printing apparatus 101, and controls an operation of devices connected to the controller unit 102 via each interface (I/F) or a memory for recording media. The ROM 108 stores a boot program for starting up the system. The RAM 109 is a volatile memory, and is used as a work memory when the control program is executed.

The HDD 110 is a storage medium such as a magnetic disk, and stores a control program and image data. The EEPROM 111 is a nonvolatile memory, and stores a setting value necessary when a control program is executed. Information (a sheet size and a sheet type) about each sheet holding unit is stored in the EEPROM 111.

The CPU 107 can receive Page Description Language (PDL) data from a personal computer (PC) 113 which is an external apparatus communicably connected to the printing apparatus 101 via a local area network/wide area network (LAN/WAN) 112 and cause the printer unit 105 to perform printing based on the received PDL data (a PDL job). The PDL data is created by a printer driver installed into the PC 113 serving as a host computer.

While the one CPU 107 performs each of processes illustrated in a flowchart described below, using one memory (RAM 109) in the printing apparatus 101, the printing apparatus 101 may have another form. For example, each of the processes can also be performed by causing a plurality of CPUs and a plurality of RAMs, hard disk drives (HDDs) and solid state drives (SSDs) to cooperate with each other. Alternatively, some of the processes described below, may be performed using a hardware circuit such as an Application Specific Integrated Circuit (ASIC).

Figure 2:
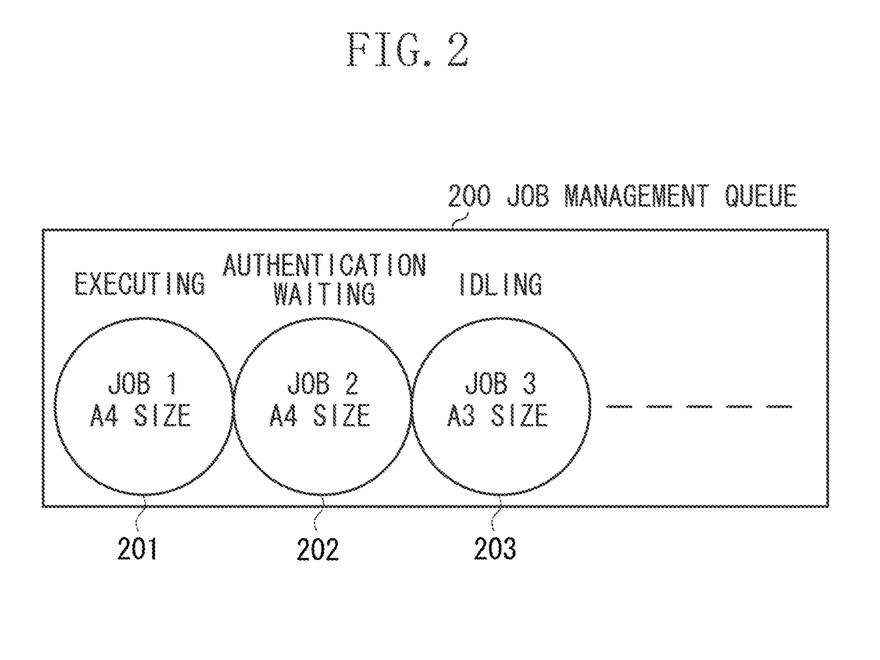
FIG. 2 is a conceptual diagram of a job management queue in the exemplary embodiment.

FIG. 2 is a conceptual diagram of a job management queue 200 which the printing apparatus 101 uses to manage a print job. A print job including image data and a print setting is stored in the HDD 110 or the RAM 109. The HDD 110 or the RAM 109 can store a plurality of print jobs, and while one of the print jobs is being executed, the other print jobs can be in a standby state without being executed. In the job management queue 200, the print jobs are managed while being arranged in an input order (the order in which the printing apparatus 101 receives the print job).

In an illustrated example, a job 1 (201) is being currently executed, and is followed by a job 2 (202) and a job 3 (203). When the execution of the job 1 (201) ends, a print job immediately succeeding the job 1 (201) usually starts to be executed. However, in the illustrated example, in the job 2 (202) immediately succeeding the job 1 (201), a password for authentication printing is set, and authentication has not yet been performed (a password input is waited for). Therefore, printing is not immediately performed.

Authentication printing will be described below.

Authentication printing is a function of setting a password by a user who is an owner of a print job on the side of a client computer (the PC 113) serving as a transmission source of the print job and executing the print job on the condition that the password is input on the side of the printing apparatus 101. By setting the password, the printing is prevented from being performed while the user operating the client computer moves to an installation location of the printing apparatus 101. Therefore, a risk that a printed product is viewed by others can be avoided.

Figure 3:
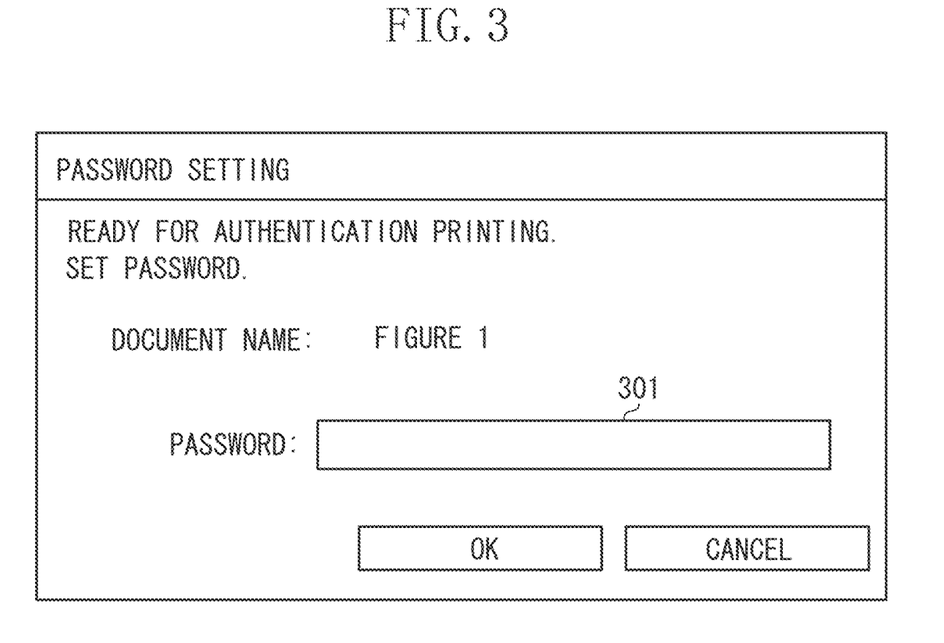
FIG. 3 illustrates an example of an operation screen displayed by a personal computer (PC) in the exemplary embodiment.

FIG. 3 illustrates an operation screen displayed on a display provided in the PC 113 when a password relating to authentication printing is set. The user of the PC 113 (an owner of a print job) inputs any password to an input column 301. The password can include a character string that is a mixture of alphabetic characters and numbers, a sequence of only numbers, or a combination of signs.

Figure 4:
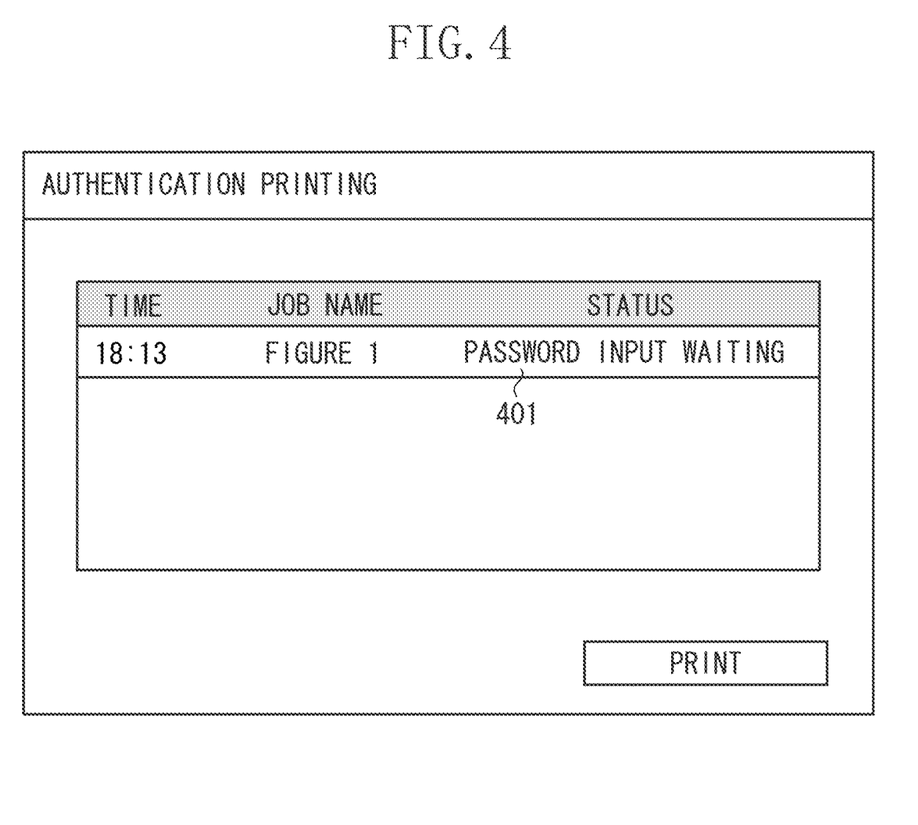
FIG. 4 illustrates an example of an operation screen displayed by the printing apparatus according to the exemplary embodiment.

FIG. 4 illustrates an operation screen displayed on the display unit 103 when a print job to which a password for authentication printing is set is selected. A list of print jobs to which a password for authentication printing is set is displayed, and a user selects the print job based on which printing is performed from among the displayed print jobs. The operation screen illustrated in FIG. 4 shifts to an operation screen illustrated in FIG. 5 in which one print job is selected.

Figure 5:
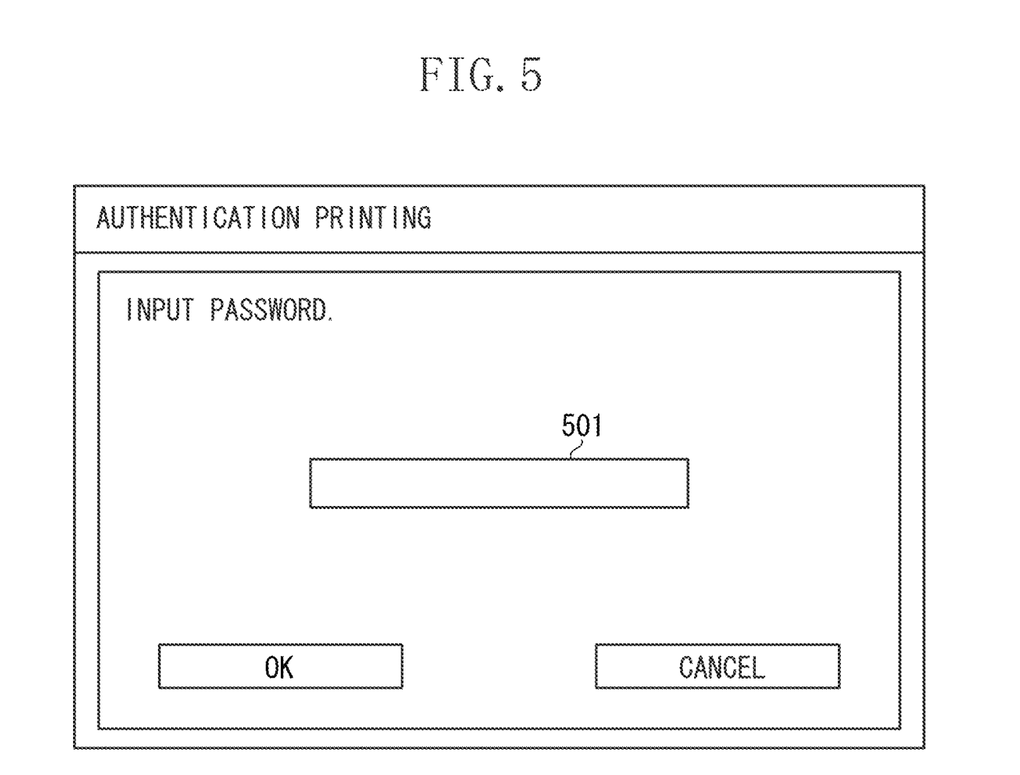
FIG. 5 illustrates an example of an operation screen displayed by the printing apparatus according to the exemplary embodiment.

FIG. 5 illustrates an operation screen displayed on the display unit 103 when a password for authentication printing is input. The user inputs a password, which has been set for a print job on the side of the client computer, into an input column 501. The controller unit 102 (the CPU 107) compares a password set for a selected print job with the password input to the input column 501. If both passwords match each other, the print job shifts to an executable state. More specifically, a state of the print job shifts from "authentication waiting" to "on standby" ("executing" if there is no print job that is being executed).

Referring to FIG. 2 again, when the execution of the job 1 (201) ends, the job 2 (202) immediately succeeding the job 1 (201) is in a state "authentication waiting". Therefore, the job 3 (203) succeeding the job 2 (202) is executed. The job 3 (203) is a print job in which a password for authentication printing is not set or which has already been authenticated. If all the print jobs existing in the job management queue 200 are in the state "authentication waiting", printing is not performed. If an interruption factor (interruption event) of the print job, such as an error, has occurred while the print job is being executed, the execution of the print job is interrupted, and is not resumed until the error is resolved.

The other print jobs in the job management queue 200 remain in a standby state. The interruption event is hereinafter simply referred to as an error.

Figure 6:
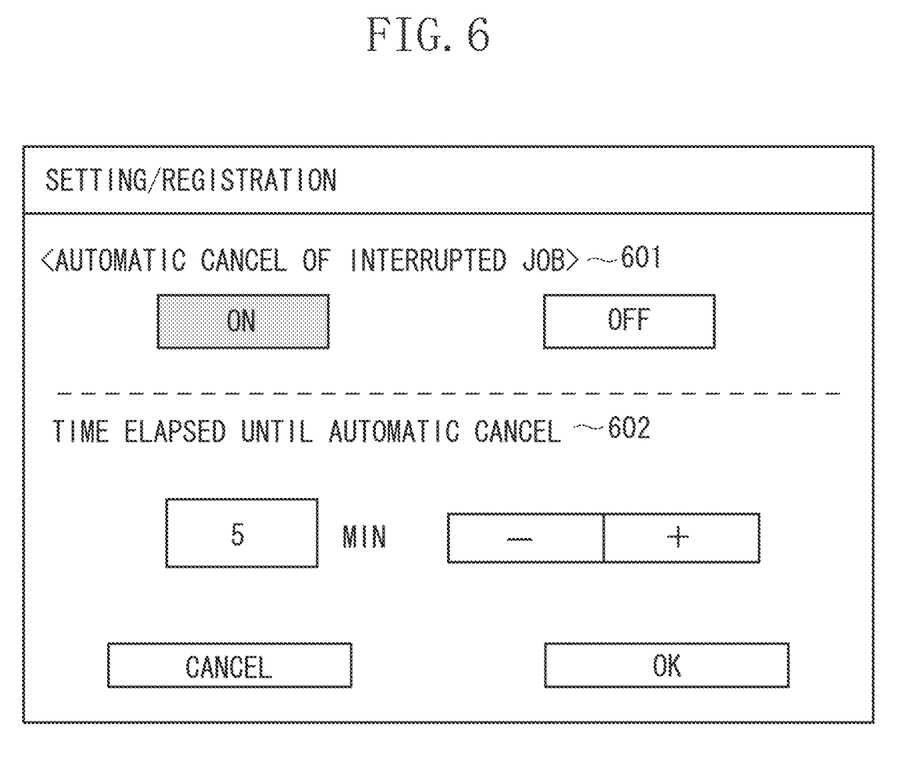
FIG. 6 illustrates an example of an operation screen displayed by the printing apparatus according to the exemplary embodiment.

"Automatic cancel" of a print job will be described below. FIG. 6 illustrates an operation screen displayed on the display unit 103 when a setting relating to "automatic cancel" is performed. If an error has occurred while a print job is being executed, the execution of the print job is interrupted, and is not resumed until the error is resolved, as described above. In this case, when the error remains unresolved for a long time, the print job is left interrupted. This state is not preferable from the viewpoint of security particularly when a content printed according to the print job includes confidential information.

In view of this point, the printing apparatus 101 has an "automatic cancel" function for cancelling a print job. "Automatic cancel" is a function of automatically canceling the interrupted job when an error has occurred while a print job is being executed and the execution of the print job remains interrupted for a predetermined period of time If emphasis is placed on security, in cancelling the interrupted print job other print jobs existing in the job management queue 200 at that time, are canceled together. This is because it is not easy for owners of the other print jobs standing by, to predict when the error is resolved or when the print job causing the error is canceled t. When printing is performed at an unintended timing, a printed product is easily viewed by others. However, among the other print jobs existing in the job management queue 200, the print jobs which are not printable, are not canceled, as described below.

On or OFF can be selected using "automatic cancel" of an item 601 in the operation screen illustrated in FIG. 6. If "automatic cancel" is set to ON, a predetermined time length (a period of time T1) can be set using an item 602. Only the manager of the printing apparatus 101 can operate the operation screen illustrated in FIG. 6. The user needs to be authenticated as a manager in order to display the operation screen illustrated in FIG. 6.

Figure 7:
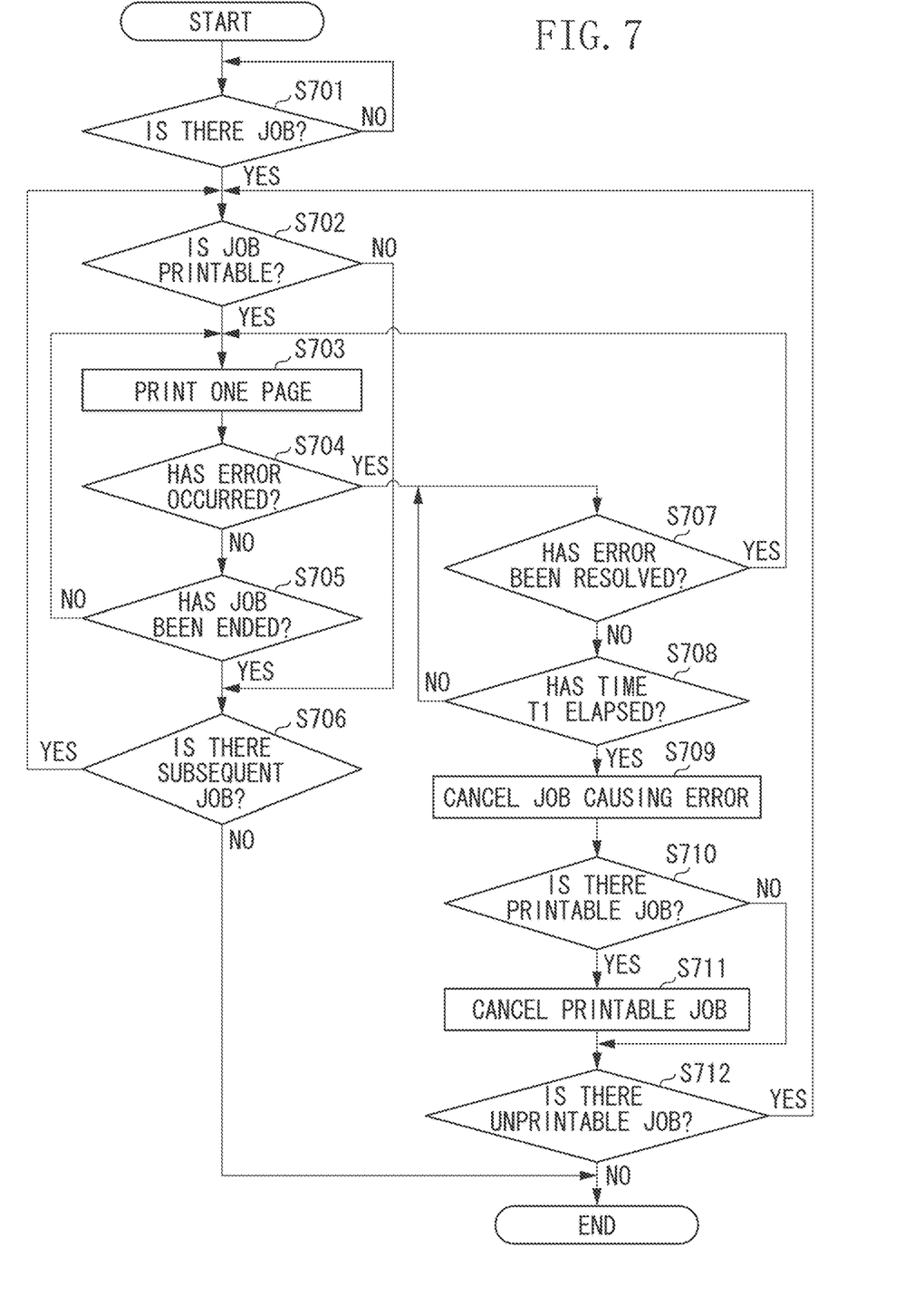
FIG. 7 is a flowchart illustrating an operation of the printing apparatus according to the exemplary embodiment.

FIG. 7 is a flowchart illustrating operations relating to execution of a print job when "automatic cancel" is set to ON. Each of the operations (steps) illustrated in the flowchart of FIG. 7 is implemented when the CPU 101 in the printing apparatus 101 executes a control program stored in the ROM 108.

In step S701, the CPU 107 determines whether a print job exists in the job management queue 200. If the print job exists (YES in step S701), the processing proceeds to step S702. In step S702, the CPU 107 determines whether a print job at the head of the job management queue 200 remains printable. The above described "authentication waiting" and "on standby" respectively mean an unprintable state and a printable state. If the print job at the head is printable, the processing proceeds to step S703. If the print job is not printable, the processing proceeds to step S706.

In step S703, the CPU 107 prints one page based on the print job. In step S704, the CPU 107 determines whether any error has occurred which restricts the execution of the print job. If the error has occurred (YES in step S704), the processing proceeds to step S707. If the error has not occurred (NO in step S704), the processing proceeds to step S705.

In step S705, the CPU 107 determines whether the print job, which is being executed, has been ended (printing of all pages has been completed). If the print job, which is being executed, has been ended (YES in step S705), the processing proceeds to step S706. If the print job, which is being executed, has not been ended (NO in step S705), the processing returns to step S703. In step S703, the CPU 107 prints a subsequent page. In step S706, the CPU 107 refers to the job management queue 200, and determines whether there is a subsequent job. If the subsequent job exists (YES in step S706), the processing returns to step S702. In step S702, the CPU 107 determines whether the print job is printable. If print jobs exist in the job management queue 200, and not all the print jobs are printable, the processing does not end, and the CPU 107 waits until any one of the print jobs enters a printable state.

In step S707, the CPU 107 determines whether the error that has occurred has been resolved. If the error that has occurred is "no sheet", the user replenishes sheets and the error is resolved. If the error that has occurred is "no toner", the user replenishes toner to resolve the error. If the error that has occurred is a "sheet jam", the user removes a jammed sheet to resolve the error. If the error that has occurred has been resolved (YES in step S707), the processing returns to step S703. In step S703, the CPU 107 prints a subsequent page. On the other hand, if the error that has occurred has not been resolved (NO in step S707), the processing proceeds to step S708. In step S708, the CPU 107 determines whether a predetermined period of time T1 has elapsed since the error occurred.

If the predetermined time T1 has elapsed (YES in step S708), the processing proceeds to step S709. If the predetermined time T1 has not elapsed (NO in step S708), the processing returns to step S707. If "automatic cancel" is set to OFF, the CPU 107 waits until the error is resolved regardless of an elapse of the predetermined time T1. In step S709, the CPU 107 cancels a print job causing the error (a print job that has been interrupted due to the occurrence of the error).

In step S710, the CPU 107 determines whether the print job, which is printable, exists among the other print jobs in the job management queue 200. If the print job, which is printable, exists in the job management queue 200 (YES in step S710), the CPU 107 identifies the print job. In step S711, the CPU 107 cancels the identified print job. At this time, the print job, which is not printable, is not canceled.

As described above, if emphasis is placed on security in "automatic cancel" of the print job, in cancelling the interrupted print job, the other print jobs existing in the job management queue 200 at the time point, are also canceled together. However, even if the error is resolved in the print job that is not printable, or the print job causing the error is canceled, printing is not immediately performed. Therefore, a security risk is not so high from the viewpoint of leakage of confidential information. Nevertheless, when all the print jobs are automatically canceled based on the occurrence of the error, the canceled print jobs need to be retransmitted from the client computer, which takes time and labor. In view of this point, in the present exemplary embodiment, among the other print jobs existing in the job management queue 200, the print job which is printable is canceled, and the print jobs which are not printable, are not canceled.

In step S712, the CPU 107 determines whether the print job which is not printable, exists. If the print job which is not printable, exists (YES in step S712), the processing returns to step S702. In step S702, the CPU 107 waits until the print job enters a printable state. If the print job which is not printable, does not exist (i.e., if no print job exists in the job management queue 200 (NO in step S712), the processing ends.

As described above, the printing apparatus 101 according to the present exemplary embodiment includes storage units (the HDD 110 or the RAM 109 and the job management queue 200) capable of storing a plurality of print jobs. When the error has occurred while the print job is being executed, the printing apparatus 101 identifies a print job which is printable, from among the other print jobs stored in the storage unit. The printing apparatus 101 cancels the print job which is being executed when the error has occurred and the identified print job, based on a predetermined time which has elapsed in a state where an error is occurring.

Thus, when the error has occurred while the print job is being executed, information leakage can be prevented without significantly reducing usability.

In the above description, the print job in which the password for authentication printing has been set and which has not yet been authenticated (into which the password has not yet been input) is handled as a print job that is not printable. The print job in which the password for authentication printing has been set and which has already been authenticated (into which the password has already been input) or the print job in which the password for authentication printing has not been set is handled as a print job that is printable. However alternatively, it may be determined whether the print job is printable, under another condition. For example, the specific print job, which the user of the printing apparatus 101 has explicitly instructed the printing apparatus 101 to suspend, may be handled as a print job that is not printable.

Whether to cancel the other print jobs which are not printable when the error has occurred, may be set on the operation screen illustrated in FIG. 6. If the other print job which is not printable when the error has occurred, is set to be canceled, the determination in step S710 is omitted, and all the print jobs in the job management queue 200 are canceled in step S711.

According to the present technique, when the interruption event of the print job has occurred while the print job is being executed, information leakage can be prevented without significantly reducing usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
 a storage configured to store a plurality of print jobs including a first print job and a second print job, wherein a password has been set for the second print job; and
 a controller including a memory storing instructions and a processor which executes the instructions, the controller being configured to:
 interrupt the first print job that is being executed in accordance with occurrence of an interruption event of the first print job while the first print job is being executed,
 cancel the first print job and the second print job based on a lapse of predetermined time since the first print job was interrupted, in a case where authentication of the password of the second print job is executed before the lapse of the predetermined time since the first print job was interrupted, and
 cancel the first print job but not cancel the second print job, based on the lapse of the predetermined time since the first print job was interrupted, in a case where the authentication of the password of the second print job is not executed before the lapse of the predetermined time since the first print job was interrupted.

2. The printing apparatus according to claim 1, wherein the controller is configured to keep the second print job not cancelled stored in the storage without cancelling the second print job.

3. The printing apparatus according to claim 1, wherein the controller is configured to perform the authentication based on a user's operation.

4. The printing apparatus according to claim 3, wherein the controller is configured to perform the authentication based on a password input by the user.

5. The printing apparatus according to claim 1,
 wherein the controller automatically cancels the first print job and the second print job based on the lapse of the predetermined time since the first print job was interrupted, that is being executed in the case where the authentication of the password of the second print job is executed before the lapse of the predetermined time since the first print job was interrupted, and
 wherein the controller automatically cancels the first print job but does not cancel the second print job based on the lapse of the predetermined time since the first print job was interrupted, that is being executed in the case where the authentication of the password of the second print job is not executed before the lapse of the predetermined time since the first print job was interrupted.

6. The printing apparatus according to claim 1, wherein the predetermined event is an error event of a print job.

7. The printing apparatus according to claim 1,
 wherein the second print job is received after the first print job.

8. The printing apparatus according to claim 1,
 wherein the plurality of print jobs includes a third print job for which no password has been set, and wherein the third print job is canceled based on a lapse of predetermined time since the first print job was interrupted.

9. The printing apparatus according to claim 1,
wherein the controller enables printing the second print job in a case where the authentication of the password of the second print job that is not cancelled is executed after the second print job is not cancelled.

10. A method for controlling a printing apparatus comprising a storage configured to store a plurality of print jobs including a first print job and a second print job, wherein a password has been set for the second print job, the method comprising:
   interrupting the first print job that is being executed in accordance with occurrence of an interruption event of the first print job while the first print job is being executed,
   cancelling the first print job and the second print job based on a lapse of predetermined time since the first print job was interrupted, in a case where authentication of the password of the second print job is executed before the lapse of the predetermined time since the first print job was interrupted, and
   cancelling the first print job but not cancelling the second print job based on the lapse of the predetermined time since the first print job was interrupted, in a case where the authentication of the password of the second print job is not executed before the lapse of the predetermined time since the first print job was interrupted.

11. The method according to claim 10,
wherein the second print job is received after the first print job.

* * * * *